(12) United States Patent
Song et al.

(10) Patent No.: US 10,658,715 B2
(45) Date of Patent: May 19, 2020

(54) BATTERY MODULE HEAT MANAGEMENT ASSEMBLY

(71) Applicant: CONTEMPORARY AMPEREX TECHNOLOGY CO., LIMITED, Ningde (CN)

(72) Inventors: Yi Song, Ningde (CN); Yanhuo Xiang, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 227 days.

(21) Appl. No.: 15/880,348

(22) Filed: Jan. 25, 2018

(65) Prior Publication Data

US 2018/0151929 A1 May 31, 2018

Related U.S. Application Data

(63) Continuation of application No. PCT/CN2015/085177, filed on Jul. 27, 2015.

(51) Int. Cl.
*H01M 10/6551* (2014.01)
*H01M 2/10* (2006.01)
(Continued)

(52) U.S. Cl.
CPC ..... *H01M 10/6551* (2015.04); *H01M 2/1016* (2013.01); *H01M 2/1077* (2013.01);
(Continued)

(58) Field of Classification Search
CPC ........... H01M 10/613; H01M 10/6556; H01M 2/1077; H01M 10/615; H01M 10/6551;
(Continued)

(56) References Cited

U.S. PATENT DOCUMENTS

2011/0198335 A1    8/2011   Lin
2013/0266838 A1* 10/2013   Von Borck ................ F28F 3/12
                                                                                                     429/120

(Continued)

FOREIGN PATENT DOCUMENTS

CN    102439756 A    5/2012
CN    102511091 A    6/2012
(Continued)

OTHER PUBLICATIONS

Contemporary Amperex Technology Co., Limited, Extended European Search Report, EP15899178.6, dated Jan. 30, 2019, 7 pgs.

*Primary Examiner* — Imran Akram
(74) *Attorney, Agent, or Firm* — Morgan, Lewis & Bockius LLP

(57) ABSTRACT

The present disclosure provides a battery module heat management assembly which comprises a cooling mechanism (1), heating films (2) and heat insulating layers (3). The cooling mechanism (1) comprises: a plurality of multi-channel pipe groups (10) arranged side by side, each multi-channel pipe group (10) has at least one multi-channel pipe (100), the number of the multi-channel pipe groups (10) is equal to the number of rows of battery modules (B), each multi-channel pipe group (10) corresponds to one row of the rows of battery modules (B), each of the rows of battery modules (B) has at least one battery module (B), each multi-channel pipe group (10) contacts a bottom of one corresponding row of the rows of battery modules (B) from below; a first fluid collector (11) and a second fluid collector (12) communicated with an external cooling fluid circuit and respectively provided at two ends of the plurality of multi-channel pipe groups (10), two ends of the multi-channel pipe groups (10) are respectively communicated with the first fluid collector (11) and the second fluid collector (12), so that the external cooling fluid circuit, the multi-channel pipe (Continued)

groups (10), the first fluid collector (11) and the second fluid collector (12) are communicated to cool each of the rows of battery modules (B). The heating film (2) is provided below one corresponding multi-channel pipe group (10) for heating the one corresponding multi-channel pipe group (10). The heat insulating layer (11) is provided below one corresponding heating film (2).

14 Claims, 5 Drawing Sheets

(51) Int. Cl.
  *H01M 10/6556*   (2014.01)
  *H01M 10/48*     (2006.01)
  *H01M 10/6552*   (2014.01)
  *H01M 10/617*    (2014.01)
  *H01M 10/647*    (2014.01)
  *H01M 10/6568*   (2014.01)
  *H01M 10/657*    (2014.01)
  *H01M 10/658*    (2014.01)

(52) U.S. Cl.
  CPC ....... *H01M 10/486* (2013.01); *H01M 10/617* (2015.04); *H01M 10/647* (2015.04); *H01M 10/657* (2015.04); *H01M 10/658* (2015.04); *H01M 10/6552* (2015.04); *H01M 10/6556* (2015.04); *H01M 10/6568* (2015.04)

(58) Field of Classification Search
  CPC ......... H01M 10/6552; H01M 10/6554; H01M 10/6563; H01M 10/6568; H01M 10/6567
  See application file for complete search history.

(56) References Cited

U.S. PATENT DOCUMENTS

| | | | |
|---|---|---|---|
| 2015/0090427 A1* | 4/2015 | Brandauer | H01M 10/625 165/64 |
| 2015/0200427 A1* | 7/2015 | Haskins | H01M 10/486 429/62 |
| 2015/0357688 A1* | 12/2015 | Heeg | H01M 10/625 429/120 |
| 2016/0064783 A1* | 3/2016 | Chorian | H01M 10/625 429/72 |
| 2016/0172727 A1* | 6/2016 | Chan | H01M 10/6557 429/120 |

FOREIGN PATENT DOCUMENTS

| | | |
|---|---|---|
| CN | 103314478 A | 9/2013 |
| EP | 2388852 A1 | 11/2011 |
| EP | 2544258 A1 | 1/2013 |
| KR | 20140037351 A | 3/2014 |
| WO | WO-2010148224 A2 | 12/2010 |

* cited by examiner

BATTERY MODULE HEAT MANAGEMENT ASSEMBLY

REFERENCE TO RELATED APPLICATIONS

This application is a continuation of PCT/CN2015/085177, filed on Jul. 27, 2015, which is incorporated herein by reference in its entirety.

FIELD OF THE PRESENT DISCLOSURE

The present disclosure relates to a field of battery module heat management, and particularly relates to a battery module heat management assembly.

BACKGROUND OF THE PRESENT DISCLOSURE

With gradual improvement of the electric vehicle technology and the power battery technology, the market has an increasing requires on the power battery module in energy density, power, cycle life, safety, etc. Developing a heat management unit and a heat management assembly satisfying the requirement of existing power battery module system becomes an essential project in development process of power battery system.

Regarding the battery management system, temperature and temperature consistency are basic indexes of assessing performance, life and safety of the power battery system, and also are important parameters of estimating state of charge (SOC) and control policy of the battery management system. However, the working temperature range of the vehicle is from −30° C. to 80° C. and is far beyond the working temperature range of the power battery. Taking a specific type of a lithium-ion power battery for example, an optimal working temperature of the lithium-ion power battery ranges from 20° C. to 40° C. If the battery works at a temperature higher than 40° C. for a long time, the cycle life will be greatly reduced, and meanwhile the thermal runaway of the lithium-ion power battery will be caused at the high temperature; if the lithium-ion power battery works at a temperature lower than 0° C., besides potential security hazard possibly caused by charging at a low temperature, the lower output power and functional degradation cannot satisfy the demands of the normal working of the vehicle.

Therefore, the power battery system generally uses a heat management assembly and a thermal management module provided outside the batteries to heat and cool the batteries so as to rapidly adjust the temperature of the battery module to an appropriate working temperature range.

At present, the popular solutions of electric vehicle at domestic and oversea use an air blower system or a water cooling system to achieve the target for heat management of the battery module. Besides the air blower system is difficult to satisfy the requirements of waterproof level and dustproof level, the heat exchange efficiency of the air blower system is also lower, it is difficult to achieve the target of the temperature consistency of 5° C. required by the general lithium-ion battery, especially for the large lithium-ion battery pack. Although most of the battery packs using the water cooling system solution specially design a battery cooling plate at present, they are generally limited due to small size, heavy weight and higher manufacturing cost, and the solution using the foam and the thermal conductive pad to improve thermal transfer between the cooling plate and the battery module cannot resolve the life problem caused by the long term aging. In addition, the additional pipeline connections between the cooling plates in the battery pack not only occupy more design space and increase cost, but also bring security problem caused by leakage. In the cold winter, the function of heating rapidly at low temperature is more important. At present, most of the heating solutions of the battery pack have disadvantages such as low heating efficiency, uneven heating, bad reliability of the heating units and the like, and most of the heating solutions select to integrate the heating units in the battery module or separate the heating units from the cooling plate units, which also exist the problems of inconvenient maintenance and difficult installation and so on.

SUMMARY OF THE PRESENT DISCLOSURE

In view of the problem existing in the background, an object of the present disclosure is to provide a battery module heat management assembly, which can improve cooling efficiency and heating efficiency of battery modules, promote energy utilization ratio of a battery pack system and maintain temperatures battery consistency.

Another object of the present disclosure is to provide a battery module heat management assembly, which can realize simplification in structure and save space of the battery pack.

In order to achieve the above object, the present disclosure provides a battery module heat management assembly which comprises a cooling mechanism, heating films and heat insulating layers. The cooling mechanism comprises: a plurality of multi-channel pipe groups arranged side by side, each multi-channel pipe group has at least one multi-channel pipe, the number of the multi-channel pipe groups is equal to the number of rows of battery modules, each multi-channel pipe group corresponds to one row of the rows of battery modules, each of the rows of battery modules has at least one battery module, each multi-channel pipe group contacts a bottom of one corresponding row of the rows of battery modules from below; a first fluid collector and a second fluid collector communicated with an external cooling fluid circuit and respectively provided at two ends of the plurality of multi-channel pipe groups, two ends of each multi-channel pipe of the plurality of multi-channel pipe groups are respectively communicated with the first fluid collector and the second fluid collector, so that the external cooling fluid circuit, the plurality of multi-channel pipe groups, the first fluid collector and the second fluid collector are communicated to cool all the rows of battery modules. The heating film is provided below one corresponding multi-channel pipe group for heating the one corresponding multi-channel pipe group. The heat insulating layer is provided below one corresponding heating film.

The present disclosure has the following beneficial effects: in the battery module heat management assembly according to the present disclosure, each multi-channel pipe group contacts the bottom of one corresponding row of the rows of battery modules from below, and the cooling fluid from outside flows through the first fluid collector, the multi-channel pipe groups and the second fluid collector to cool all the rows of battery modules, which effectively promotes cooling efficiency of the battery modules and ensures battery temperature consistency; the heating film is provided below one corresponding multi-channel pipe group for heating the one corresponding multi-channel pipe group and in turn heating the corresponding battery module(s), and the heat insulating layer is provided below one corresponding heating film, which reduces heat loss in heat transfer path, efficiently promotes heat efficiency of the battery module(s) and energy utilization ratio of the battery pack system; the heating film is small in size and integrated below one corresponding multi-channel pipe group, so the structure of the battery pack is simplified and the space of the battery pack is saved.

REFERENCE NUMERALS IN FIGURES ARE REPRESENTED AS FOLLOWS

Figure 1:
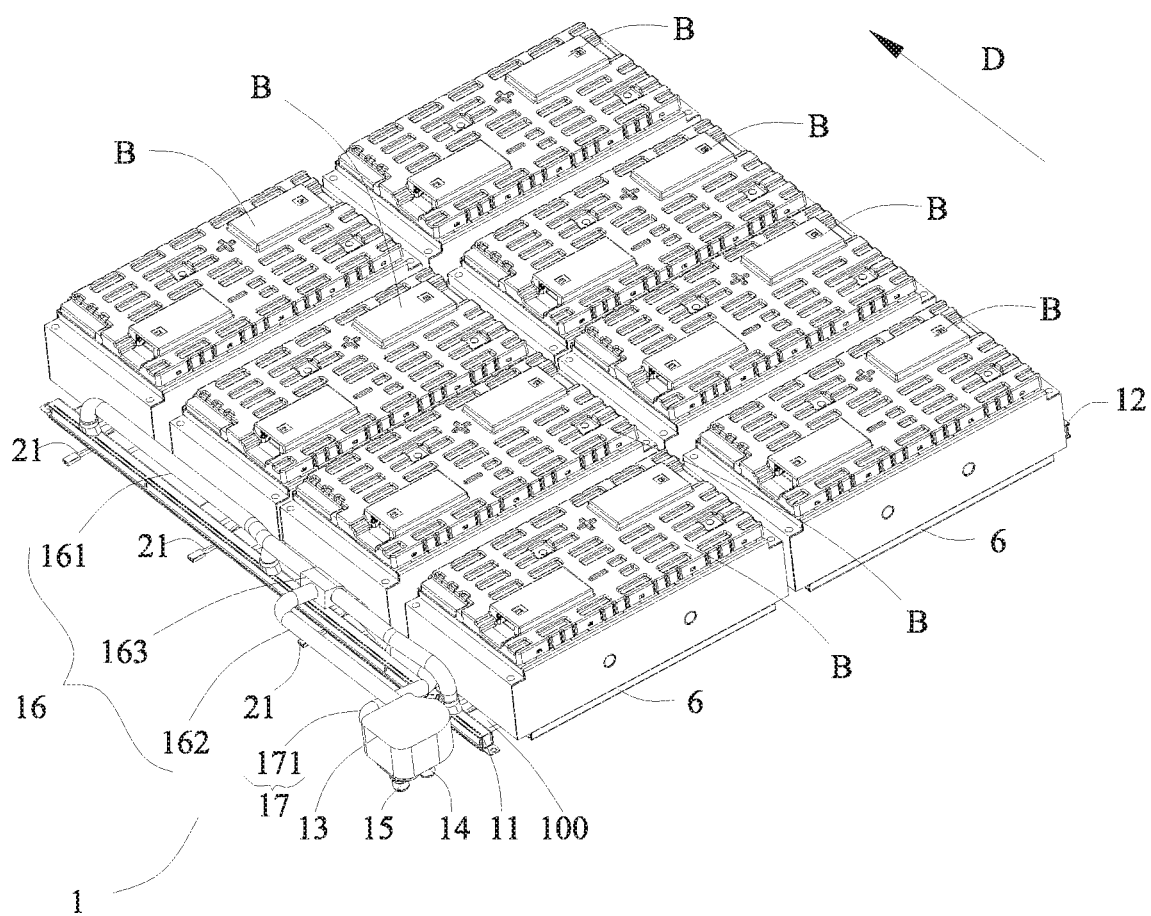
FIG. 1 is a perspective view of a battery module heat management assembly according to the present disclosure.

1 cooling mechanism
   10 multi-channel pipe group
      100 multi-channel pipe
   11 first fluid collector
      110 port
   12 second fluid collector
   13 flange
   14 fluid inflow joint
   15 fluid outflow joint
   16 fluid inflow pipeline
      161 fluid inflow branch pipe
      162 fluid inflow main pipe
      163 multi-way inflow pipe
   17 fluid outflow pipeline
      171 fluid outflow branch pipe
      172 fluid outflow main pipe
      173 multi-way outflow pipe
   18 first partitioning plate
   19 second partitioning plate
   D arrangement direction
   GP multi-channel pipe group pair
   GM group module
   TP multi-channel pipe pair
   TM pipe module
2 heating film
   21 pluggable member
   22 extending portion
3 heat insulating layer
   31 heat insulating sub-layer
4 sealing gasket
5 temperature sensor
6 supporting structure
   61 leg portion
   62 opening portion
B battery module

DETAILED DESCRIPTION

Hereinafter a battery module heat management assembly according to the present disclosure will be described in detail in combination with the figures.

Referring to FIGS. 1-7, a battery module heat management assembly according to the present disclosure comprises: a cooling mechanism 1, heating films 2 and heat insulating layers 3. The cooling mechanism 1 comprises: a plurality of multi-channel pipe groups 10 arranged side by side, each multi-channel pipe group 10 has at least one multi-channel pipe 100, the number of the multi-channel pipe groups 10 is equal to the number of rows of battery modules B, each multi-channel pipe group 10 corresponds to one row of the rows of battery modules B, each of the rows of battery modules B has at least one battery module B, each multi-channel pipe group 10 contacts a bottom of one corresponding row of the rows of battery modules B from below; a first fluid collector 11 and a second fluid collector 12 communicated with an external cooling fluid circuit and respectively provided at two ends of the plurality of multi-channel pipe groups 10, two ends of each multi-channel pipe 100 of the plurality of multi-channel pipe groups 10 are respectively communicated with the first fluid collector 11 and the second fluid collector 12, so that the external cooling fluid circuit, the plurality of multi-channel pipe groups 10, the first fluid collector 11 and the second fluid collector 12 are communicated to cool all the rows of battery modules B. The heating film 2 is provided below one corresponding multi-channel pipe group 10 for heating the one corresponding multi-channel pipe group 10. The heat insulating layer 3 is provided below one corresponding heating film 2.

In the battery module heat management assembly according to the present disclosure, each multi-channel pipe group 10 contacts the bottom of one corresponding row of the rows of battery modules B from below, and the cooling fluid from outside flows through the first fluid collector 11, the multi-channel pipe groups 10 and the second fluid collector 12 to cool all the rows of battery modules B, which effectively promotes cooling efficiency of the battery modules B and ensures battery temperature consistency; the heating film 2 is provided below one corresponding multi-channel pipe group 10 for heating the one corresponding multi-channel pipe group 10 and in turn heating the corresponding battery module(s), and the heat insulating layer 3 is provided below one corresponding heating film 2, which reduces heat loss in heat transfer path, efficiently promotes heat efficiency of the battery module(s) and energy utilization ratio of the battery pack system; the heating film 2 is small in size and integrated below one corresponding multi-channel pipe group 10, so the structure of the battery pack is simplified and the space of the battery pack is saved.

In the battery module heat management assembly according to the present disclosure, each multi-channel pipe 100, the first fluid collector 11 and the second fluid collector 12 may be made of aluminium material and integrated by welding. The welding may be soldering.

In an embodiment of the battery module heat management assembly according to the present disclosure, referring to FIGS. 1-6, the cooling mechanism 1 further comprises: a flange 13 provided to a battery pack box in a sealing mode, the battery pack box receives the rows of battery modules B; a fluid inflow joint 14 provided to the flange 13 for inflow of a cooling fluid supplied by the external cooling fluid circuit; a fluid outflow joint 15 provided to the flange 13 for outflow of the cooling fluid and returning the cooling fluid to the external cooling fluid circuit; a fluid inflow pipeline 16, one end of the fluid inflow pipeline 16 is fixed to the flange 13 and communicated with the fluid inflow joint 14, and the other end of the fluid inflow pipeline 16 is communicated with the first fluid collector 11; a fluid outflow pipeline 17, one end of the fluid outflow pipeline 17 is fixed to the flange 13 and communicated with the fluid outflow joint 15, and the other end of the fluid outflow pipeline 17 is communicated with the first fluid collector 11; and a first partitioning plate 18 inserted in the first fluid collector 11 for blocking communication between the fluid inflow pipeline 16 communicated with the first fluid collector 11 and the fluid outflow pipeline 17 communicated with the first fluid collector 11. Because the flange 13, the fluid inflow joint 14, the fluid outflow joint 15, the fluid inflow pipeline 16 and the fluid outflow pipeline 17 are connected with the first fluid collector 11, in other words, they may be positioned at a side of the first fluid collector 11, thereby saving space of the battery pack.

Figure 3:
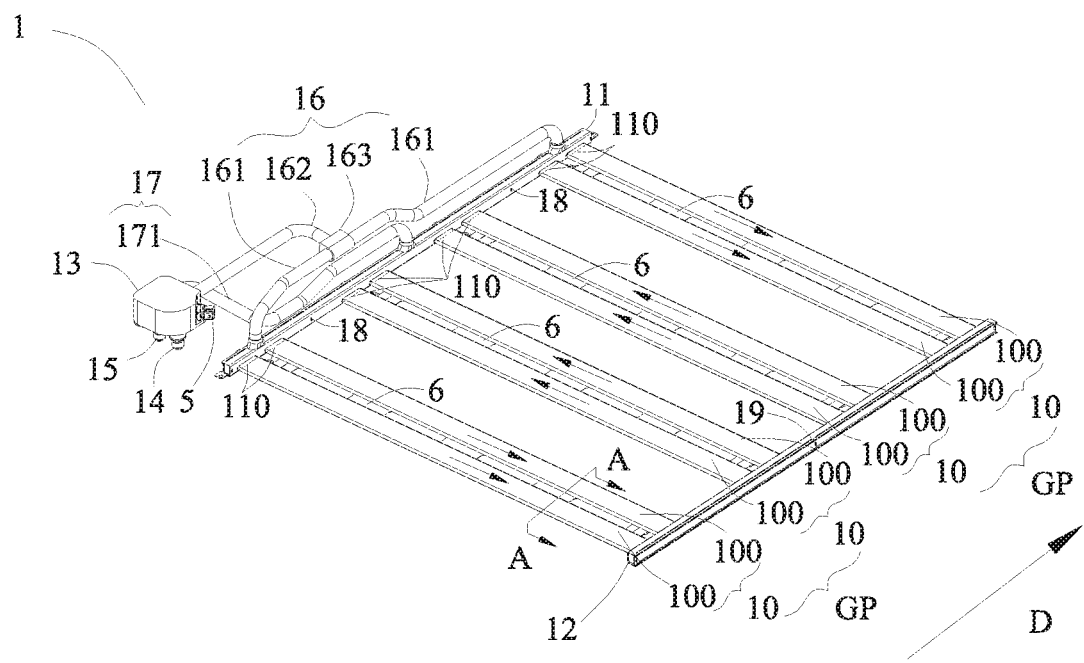
FIG. 3 is a perspective view of a cooling mechanism of the battery module heat management assembly according to the present disclosure, in which the number of multi-channel pipe groups is even.

In an embodiment of the battery module heat management assembly according to the present disclosure, referring to FIG. 3, the battery modules B of the battery pack are arranged in even rows; every two multi-channel pipe groups 10 in an arrangement direction D of the multi-channel pipe groups 10 form one multi-channel pipe group pair GP, each multi-channel pipe group 10 has at least one multi-channel pipe 100 which makes the fluid have the same flow direction in each multi-channel pipe group 10. The first fluid collector 11 have ports 110 corresponding to the plurality of multi-channel pipe groups 10, when the flow directions of the fluid of the plurality of multi-channel pipe groups 10 at the ports 110 in the arrangement direction D of the multi-channel pipe groups 10 are opposite, the first partitioning plate 18 inserted in the first fluid collector 11 is configured to block communication of two adjacent multi-channel pipe groups 10 which have the opposite flow directions. The cooling mechanism 1 of the battery module heat management assembly further comprises second partitioning plates 19 inserted in the second fluid collector 12 and blocking communication of every two adjacent multi-channel pipe group pairs GP in the second fluid collector 12, and the two multi-channel pipe groups 10 of each multi-channel pipe group pair GP form one fluid circuit. The fluid inflow pipeline 16 comprises a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 comprises a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further comprises: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further comprises: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipes 171.

Figure 4:
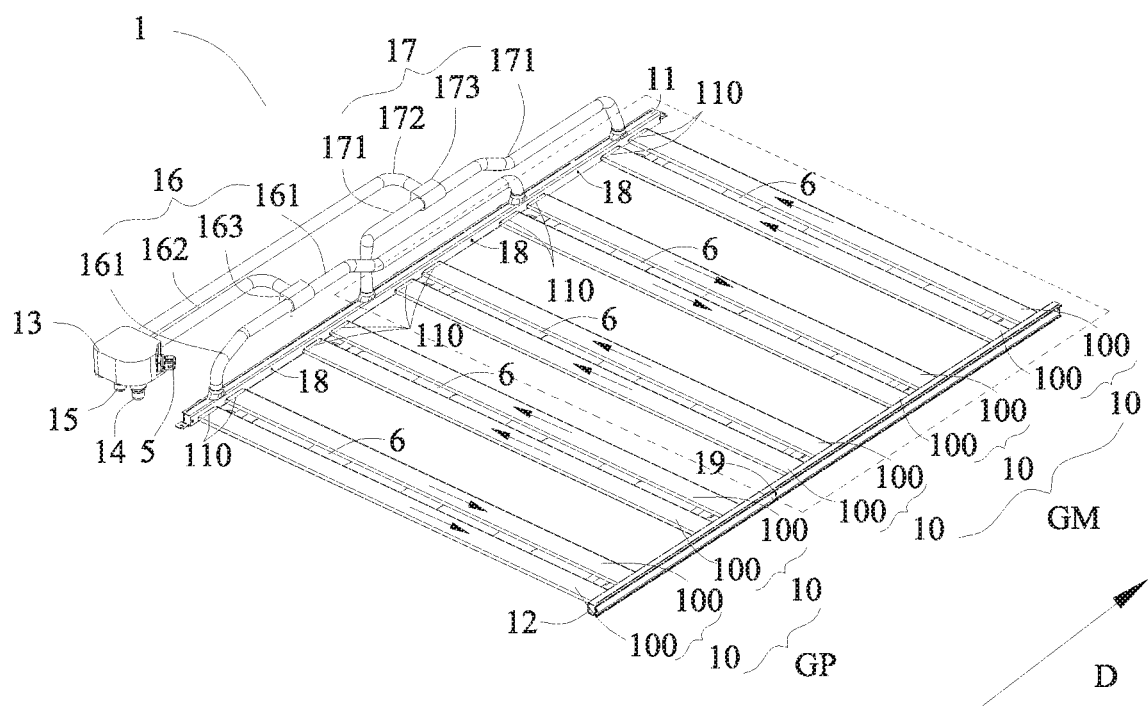
FIG. 4 is a perspective view of a cooling mechanism of the battery module heat management assembly according to the present disclosure, in which the number of multi-channel pipe groups is odd.

In an embodiment of the battery module heat management assembly according to the present disclosure, referring to FIG. 4, the battery modules B of the battery pack are arranged in odd rows and the number of the rows is more than one; three multi-channel pipe groups 10 which are continuous in the arrangement direction D of the multi-channel pipe groups 10 are selected to act as a group module GM, and the number of the multi-channel pipe groups 10 at each side of the group module GM is an integer times of two; every two multi-channel pipe groups 10 at each side of the group module GM form one multi-channel pipe group pair GP, each multi-channel pipe group 10 has at least one multi-channel pipe 100 which makes the fluid have the same flow direction in each multi-channel pipe group 10. The first fluid collector 11 have ports 110 corresponding to the plurality of multi-channel pipe groups 10, when the flow directions of the fluid of the plurality of multi-channel pipe groups 10 at the ports 110 in the arrangement direction D of the multi-channel pipe groups 10 are opposite, the first partitioning plate 18 inserted in the first fluid collector 11 is configured to block communication of two adjacent multi-channel pipe groups 10 which have the opposite flow directions. Middle one multi-channel pipe group 10 of the three multi-channel pipe groups 10 of the group module GM is used for inflow or outflow of the fluid and the other two multi-channel pipe groups 10 of the group module GM are used for outflow or inflow of the fluid, so the other two multi-channel pipe groups 10 and the shared middle one multi-channel pipe group 10 of the group module GM form two fluid circuits. When the multi-channel pipe group pairs GP are provided at the side of the group module GM, the cooling mechanism 1 of the battery module heat management assembly further comprises second partitioning plates 19 inserted in the second fluid collector 12, blocking communication of the group module GM and the adjacent multi-channel pipe group 10 in the second fluid collector 12 and blocking communication of two adjacent multi-channel pipe group pairs GP in the second fluid collector 12, and the two multi-channel pipe groups 10 of each multi-channel pipe group pair GP form one fluid circuit. The fluid inflow pipeline 16 comprises a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 comprises a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further comprises: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further comprises: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipe 171.

Figure 5:
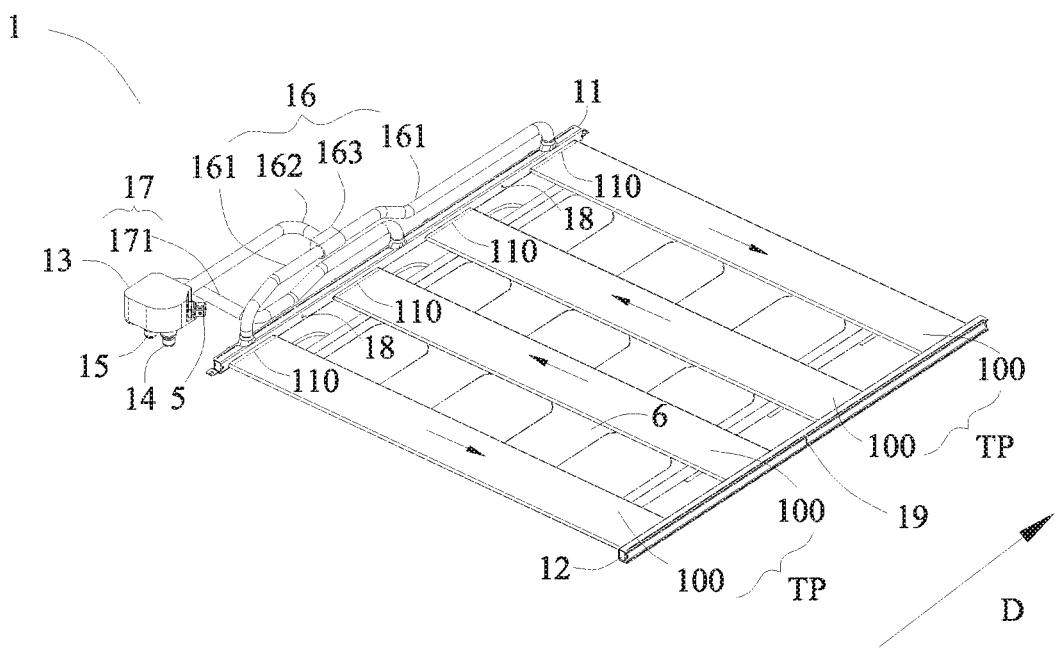
FIG. 5 is a perspective view of a cooling mechanism of the battery module heat management assembly according to the present disclosure, in which the number of multi-channel pipes is even.

In an embodiment of the battery module heat management assembly according to the present disclosure, referring to FIG. 5, the battery modules B of the battery pack are arranged in one row; the multi-channel pipe group 10 is provided as one in number, and the one multi-channel pipe group 10 has an even number of multi-channel pipes 100; every two multi-channel pipes 100 in an arrangement direction D of the multi-channel pipes 100 form one multi-channel pipe pair TP. The first fluid collector 11 have ports 110 corresponding to the multi-channel pipes 100, when the flow directions of the fluid of the multi-channel pipes 100 at the ports 110 in the arrangement direction D of the multi-channel pipes 100 are opposite, the first partitioning plate 18 inserted in the first fluid collector 11 is configured to block communication of two adjacent multi-channel pipes 100 which have the opposite flow directions. The cooling mechanism 1 of the battery module heat management assembly further comprises second partitioning plates 19 inserted in the second fluid collector 12 and blocking communication of every two adjacent multi-channel pipe pairs TP in the second fluid collector 12, and the two multi-channel pipes 100 of each multi-channel pipe pair TP form one fluid circuit. The fluid inflow pipeline 16 comprises a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 comprises a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further comprises: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further comprises: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipes 171.

Figure 6:
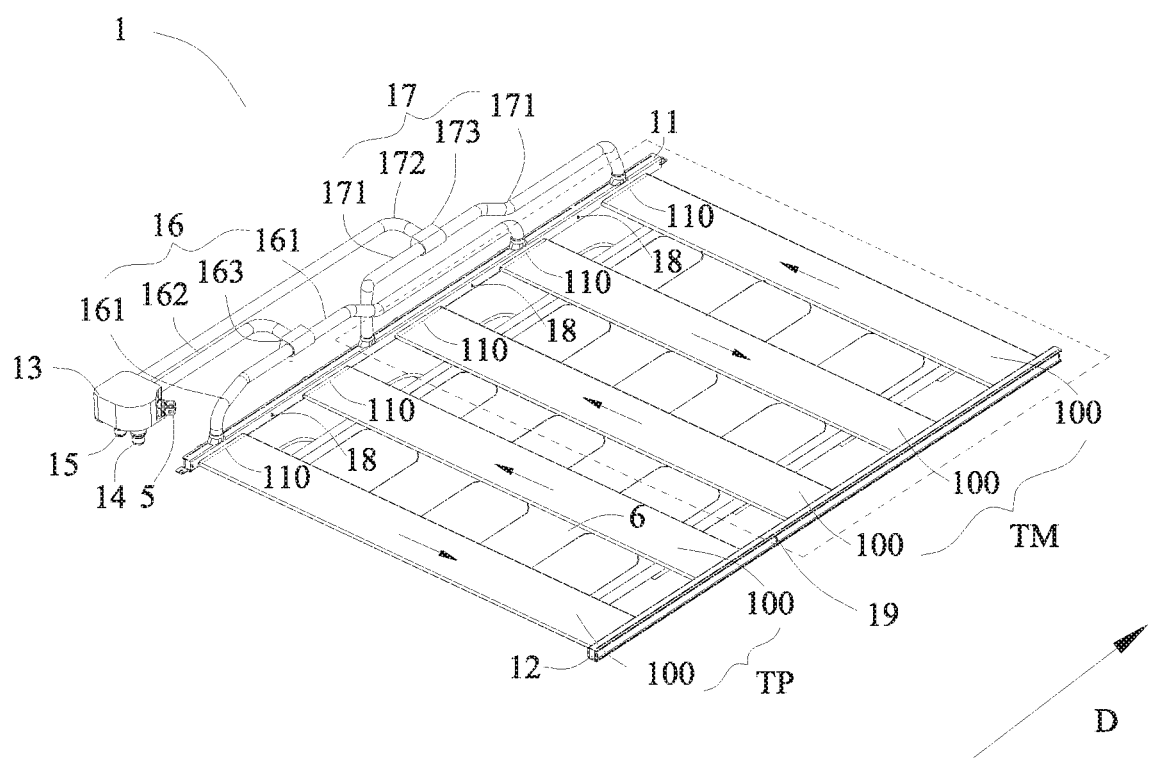
FIG. 6 is a perspective view of a cooling mechanism of the battery module heat management assembly according to the present disclosure, in which the number of multi-channel pipes is odd.

In an embodiment of the battery module heat management assembly according to the present disclosure, referring to FIG. 6, the battery modules B of the battery pack are arranged in one row; the multi-channel pipe group 10 is provided as one in number, and the one multi-channel pipe group 10 has a multi-channel pipe 100 provided as odd number which is more than one in number; three multi-channel pipes 100 which are continuous in the arrangement direction D of the multi-channel pipes 100 are selected to act as a pipe module TM, and the number of the multi-channel pipes 100 at each side of the pipe module TM is an integer times of two, every two multi-channel pipes 100 at each side of the pipe module TM form one multi-channel pipe pair TP. The first fluid collector 11 have ports 110 corresponding to the multi-channel pipes 100, when the flow directions of the fluid of the multi-channel pipes 100 at the ports 110 in the arrangement direction D of the multi-channel pipes 100 are opposite, the first partitioning plate 18 inserted in the first fluid collector 11 is configured to block communication of two adjacent the multi-channel pipes 100 which have the opposite flow directions. Middle one multi-channel pipe 100 of the three multi-channel pipes 100 of the pipe module TM is used for inflow or outflow of the fluid and the other two multi-channel pipes 100 of the pipe module TM are used for outflow or inflow of the fluid, so the other two multi-channel pipes 100 and the shared middle one multi-channel pipe 100 of the pipe module TM form two fluid circuits. When the multi-channel pipe pairs TP are provided at the side of the pipe module TM, the cooling mechanism 1 of the battery module heat management assembly further comprises second partitioning plates 19 inserted in the second fluid collector 12, blocking communication of the pipe module TM and the adjacent multi-channel pipe pair TP in the second fluid collector 12 and blocking communication of two adjacent multi-channel pipe pairs TP in the second fluid collector 12, and the multi-channel pipe groups 10 of each multi-channel pipe group pair GP form one fluid circuit. The fluid inflow pipeline 16 comprises a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 comprises a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further comprises: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further comprises: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipes 171.

Figure 2:
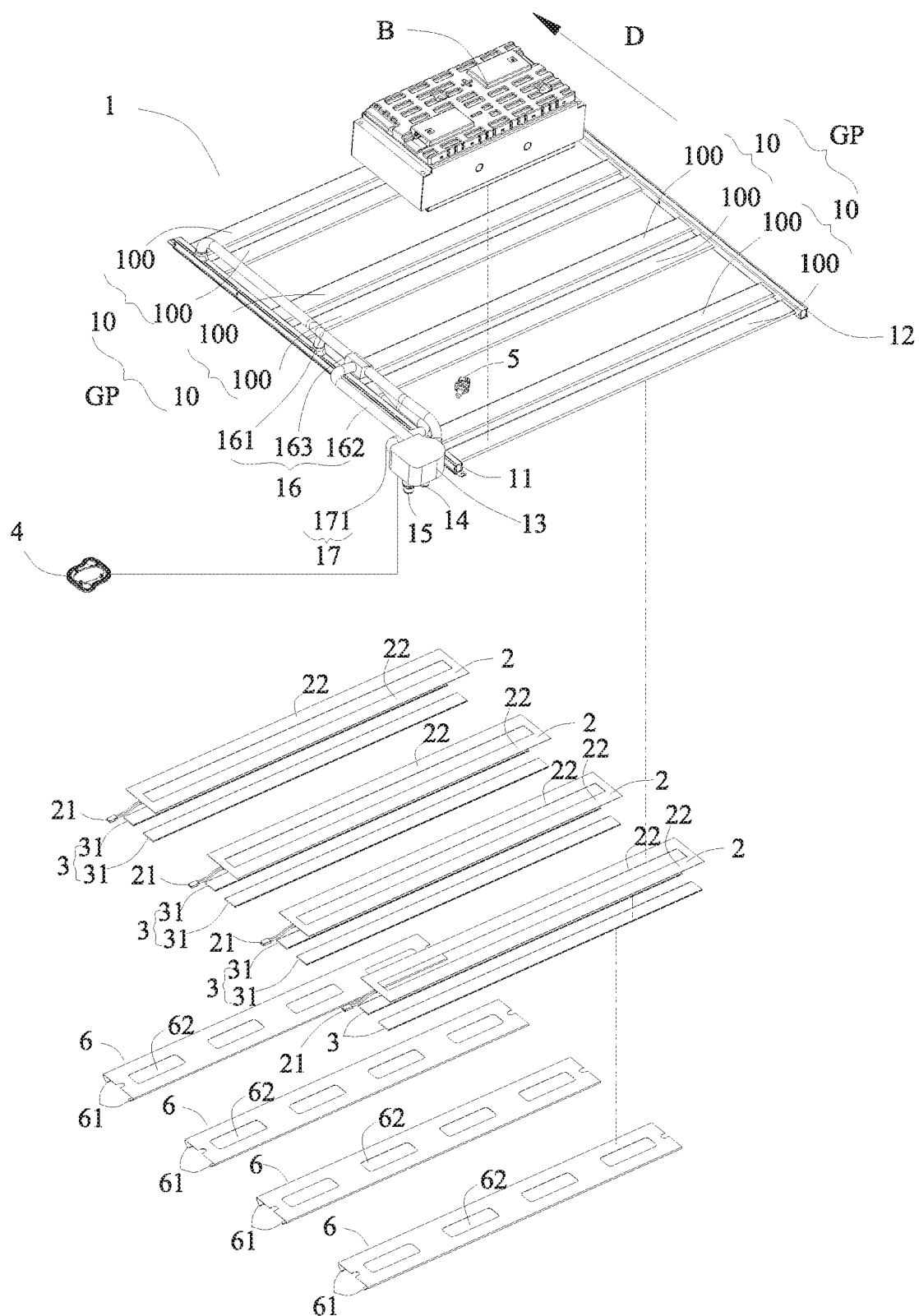
FIG. 2 is an exploded view of the battery module heat management assembly according to the present disclosure.

In an embodiment of the battery module heat management assembly according to the present disclosure, referring to FIG. 2, the battery module heat management assembly further comprises a sealing gasket 4 fixed to a bottom of the flange 13, so the flange 13 is provided to the battery pack box in a sealing mode, the battery pack box receives the rows of battery modules B. The sealing gasket 4 ensures a requirement for sealing level between the heat management assembly and the battery pack box.

In an embodiment of the battery module heat management assembly according to the present disclosure, referring to FIG. 2, the battery module heat management assembly may further comprise a temperature sensor 5 fixed to the flange 13 and communicating with a battery management system. The temperature sensor 5 may be fixed to the flange 13 by a threaded connection with a sealing gasket. The temperature sensor 5 may communicate with the battery management system via a low-voltage wire. The battery management system may detect temperatures of the cooling fluid at an inflow position and an outflow position by the temperature sensor 5 for implementing strategy and fault diagnosis of heat management.

In the battery module heat management assembly according to the present disclosure, a thickness of each heating film 2 may range from 1 mm to 3 mm. An area of the heating film may be determined based on a sum of heating power required by the battery module(s) in each row.

In an embodiment of the battery module heat management assembly according to the present disclosure, referring to FIG. 1 and FIG. 2, an end of each heating film 2 adjacent to the first fluid collector 11 may be provided with a pluggable member 21 for plugging with a high voltage circuit to allow the heating films 2 to be connected with the high voltage circuit in parallel. The heating film 2 adopts an integral design concept to ensure the convenience and the maintainability of installation, decrease electrical connection as much as possible and reduce security risk, which is particularly important for a large battery pack with a large number of battery modules.

In an embodiment of the battery module heat management assembly according to the present disclosure, each heating film 2 comprises a substrate with a positive temperature coefficient and two insulating films respectively attached on two opposite surfaces of the substrate. The substrate may be a composite material. The substrate may be made by printing. The insulating film may be made of high voltage insulation material. The substrate with the positive temperature coefficient has higher heating efficiency at a low temperature than at a high temperature, and may stabilize the temperature of the battery module at a set value (such as 10° C.) after heating for a certain time, which not only avoids the battery module being heated excessively but also effectively promotes energy utilization efficiency and energy allocation efficiency of the dynamical system.

In an embodiment of the battery module heat management assembly according to the present disclosure, each heating film 2 may be fixed between one corresponding multi-channel pipe group 10 and one corresponding heat insulating layer 3 via adhesives on two surfaces of each heating film 2.

In an embodiment of the battery module heat management assembly according to the present disclosure, referring to FIG. 2, each heating film 2 may have an extending portion 22 which is identical with the multi-channel pipe 100 of one corresponding multi-channel pipe group 10 in number and extends along an axial direction of the multi-channel pipe 100.

In an embodiment of the battery module heat management assembly according to the present disclosure, referring to FIG. 2, each heat insulating layer 3 may have a heat insulating sub-layer 31 which is identical with the extending portion 22 of one corresponding heating film 2 in number.

In the battery module heat management assembly according to the present disclosure, each heat insulating layer 3 may be heat resisting plastic or heat resisting rubber.

In an embodiment of the battery module heat management assembly according to the present disclosure, referring to FIG. 2 and FIG. 7, the battery module heat management assembly may further comprise a plurality of supporting structures 6, each supporting structure 6 is provided below one corresponding heat insulating layer 3. The supporting structure 6 is made of elastic material, the elastic material may be metal material, and the metal material may be stainless steel. The supporting structure 6 provides long-term, effective and stable supporting force under a compressed space state formed after the battery modules and the battery pack box are assembled, thereby improving the heat exchange performance between the power battery modules and the heat management unit. The supporting structure 6 is different from some past solutions using foam as support, and solves the aging problem and the attenuation problem of working life which exist in the foam and are caused by long-term alternate loading, ensures that the supporting force are stabilized at a set range for long term, and also meets the requirement of durability, stabilization, low cost and light weight.

Figure 7:
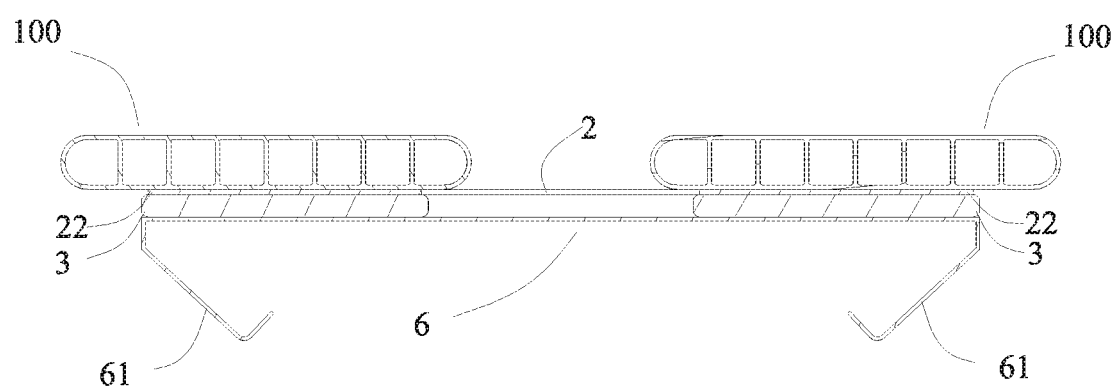
FIG. 7 is a cross-sectional view taken along line A-A of FIG. 3.

In an embodiment of the battery module heat management assembly according to the present disclosure, referring to FIG. 2 and FIG. 7, each supporting structure 6 may have bending leg portions 61.

In an embodiment of the battery module heat management assembly according to the present disclosure, referring to FIG. 2 and FIG. 7, each supporting structure 6 may have a plurality of opening portions 62.

In the battery module heat management assembly according to the present disclosure, the battery module B may be a power battery module B.

In the battery module heat management assembly according to the present disclosure, the cooling fluid may be liquid or gas. The liquid may be a mixture of water and ethylene glycol.

What is claimed is:

1. A battery module heat management assembly, wherein the battery module heat management assembly comprises:
    a cooling mechanism comprising:
        a plurality of multi-channel pipe groups arranged side by side, each multi-channel pipe group has at least one multi-channel pipe, the number of the multi-channel pipe groups is equal to the number of rows of battery modules, each multi-channel pipe group corresponds to one row of the rows of battery modules, each of the rows of battery modules has at least one battery module, each multi-channel pipe group contacts a bottom of one corresponding row of the rows of battery modules from below;
        a first fluid collector and a second fluid collector communicated with an external cooling fluid circuit and respectively provided at two ends of the plurality of multi-channel pipe groups, two ends of each multi-channel pipe of the plurality of multi-channel pipe groups are respectively communicated with the first fluid collector and the second fluid collector, so that the external cooling fluid circuit, the plurality of multi-channel pipe groups, the first fluid collector and the second fluid collector are communicated to cool all the rows of battery modules;

heating films, wherein each heating film is provided below one corresponding multi-channel pipe group for heating the one corresponding multi-channel pipe group;

heat insulating layers, wherein each heat insulating layer is provided below one corresponding heating film; and supporting structures, wherein each supporting structure is provided below one corresponding heat insulating layer, wherein the supporting structure is made of elastic material and each supporting structure has bending leg portions.

2. The battery module heat management assembly according to claim 1, wherein the cooling mechanism further comprises:

a flange provided to a battery pack box in a sealing mode, the battery pack box receives the rows of battery modules;

a fluid inflow joint provided to the flange for inflow of a cooling fluid supplied by the external cooling fluid circuit;

a fluid outflow joint provided to the flange for outflow of the cooling fluid and returning the cooling fluid to the external cooling fluid circuit;

a fluid inflow pipeline, one end of the fluid inflow pipeline is fixed to the flange and communicated with the fluid inflow joint, and the other end of the fluid inflow pipeline is communicated with the first fluid collector;

a fluid outflow pipeline, one end of the fluid outflow pipeline is fixed to the flange and communicated with the fluid outflow joint, and the other end of the fluid outflow pipeline is communicated with the first fluid collector; and a first partitioning plate inserted in the first fluid collector for blocking communication between the fluid inflow pipeline communicated with the first fluid collector and the fluid outflow pipeline communicated with the first fluid collector.

3. The battery module heat management assembly according to claim 2, wherein the battery modules of the battery pack are arranged in even rows;

every two multi-channel pipe groups in an arrangement direction of the multi-channel pipe groups form one multi-channel pipe group pair, each multi-channel pipe group has at least one multi-channel pipe which makes the cooling fluid have the same flow direction in each multi-channel pipe group;

the first partitioning plate inserted in the first fluid collector is configured to block communication of two adjacent multi-channel pipe groups in which the cooling fluid has the opposite flow directions;

the cooling mechanism of the battery module heat management assembly further comprises second partitioning plates inserted in the second fluid collector and blocking communication of every two adjacent multi-channel pipe group pairs in the second fluid collector, and the two multi-channel pipe groups of each multi-channel pipe group pair form one fluid circuit;

the fluid inflow pipeline comprises a fluid inflow branch pipe, one end of the fluid inflow branch pipe is communicated with each part of the first fluid collector which is partitioned by the first partitioning plate and used for inflow of the cooling fluid;

the fluid outflow pipeline comprises a fluid outflow branch pipe, one end of the fluid outflow branch pipe is communicated with each part of the first fluid collector which is partitioned by the first partitioning plate and used for outflow of the cooling fluid;

when the fluid inflow branch pipe is provided as one in number, the other end of the fluid inflow branch pipe is fixed to the flange and communicated with the fluid inflow joint;

when the fluid inflow branch pipe is provided as more than one in number, the fluid inflow pipeline further comprises: a fluid inflow main pipe, one end of the fluid inflow main pipe is fixed to the flange and communicated with the fluid inflow joint; and a multi-way inflow pipe communicating the other end of the fluid inflow main pipe and the other ends of all the fluid inflow branch pipes;

when the fluid outflow branch pipe is provided as one in number, the other end of the fluid outflow branch pipe is fixed to the flange and communicated with the fluid outflow joint;

when the fluid outflow branch pipe is provided as more than one in number, the fluid outflow pipeline further comprises: a fluid outflow main pipe, one end of the fluid outflow main pipe is fixed to the flange and communicated with the fluid outflow joint; and a multi-way outflow pipe communicating the other end of the fluid outflow main pipe and the other ends of all the fluid outflow branch pipes.

4. The battery module heat management assembly according to claim 2, wherein the battery module heat management assembly further comprises a sealing gasket fixed to a bottom of the flange, so the flange is provided to the battery pack box in a sealing mode, the battery pack box receives the rows of battery modules.

5. The battery module heat management assembly according to claim 2, wherein the battery module heat management assembly further comprises a temperature sensor fixed to the flange and communicating with a battery management system.

6. The battery module heat management assembly according to claim 5, wherein the temperature sensor is fixed to the flange by a threaded connection with a sealing gasket.

7. The battery module heat management assembly according to claim 5, wherein the temperature sensor communicates with the battery management system via a low-voltage wire.

8. The battery module heat management assembly according to claim 1, wherein a thickness of each heating film ranges from 1 mm to 3 mm.

9. The battery module heat management assembly according to claim 1, wherein an end of each heating film adjacent to the first fluid collector is provided with a pluggable member for plugging with a high voltage circuit to allow the heating films to be connected with the high voltage circuit in parallel.

10. The battery module heat management assembly according to claim 1, wherein each heating film comprises a substrate with a positive temperature coefficient and two insulating films respectively attached on two opposite surfaces of the substrate.

11. The battery module heat management assembly according to claim 1, wherein each heating film is fixed between one corresponding multi-channel pipe group and one corresponding heat insulating layer via adhesives on two surfaces of each heating film.

12. The battery module heat management assembly according to claim 1, wherein each heating film has an extending portion which is identical with the multi-channel pipe of one corresponding multi-channel pipe group in number and extends along an axial direction of the multi-channel pipe.

13. The battery module heat management assembly according to claim 12, wherein each heat insulating layer has a heat insulating sub-layer which is identical with the extending portion of one corresponding heating film in number.

14. The battery module heat management assembly according to claim 1, wherein each supporting structure has a plurality of opening portions.

* * * * *